(12) United States Patent
Witteler et al.

(10) Patent No.: US 7,749,337 B2
(45) Date of Patent: Jul. 6, 2010

(54) METHOD FOR THE PASSIVATION OF METAL SURFACES WITH POLYMERS CONTAINING ACID GROUPS

(75) Inventors: Helmut Witteler, Wachenheim (DE); Walter Bertkau, Ludwigshafen (DE); Thomas Heidenfelder, Dannstadt-Schauernheim (DE); Alexander Göthlich, Mannheim (DE); Jens Haas, Ludwigshafen (DE); Frank Klippel, Ludwigshafen (DE); Gunnar Schornick, Neuleiningen (DE)

(73) Assignee: BASF SE, Ludwigshafen (DE)

( * ) Notice: Subject to any disclaimer, the term of this patent is extended or adjusted under 35 U.S.C. 154(b) by 284 days.

(21) Appl. No.: 11/659,526

(22) PCT Filed: Jun. 13, 2006

(86) PCT No.: PCT/EP2006/063168

§ 371 (c)(1),
(2), (4) Date: Feb. 5, 2007

(87) PCT Pub. No.: WO2006/134116

PCT Pub. Date: Dec. 21, 2006

(65) Prior Publication Data

US 2007/0240792 A1    Oct. 18, 2007

(30) Foreign Application Priority Data

Jun. 14, 2005    (DE) .................. 10 2005 027 567

(51) Int. Cl.
C23C 22/53    (2006.01)
(52) U.S. Cl. ..................................... 148/252
(58) Field of Classification Search ................. None
See application file for complete search history.

(56) References Cited

U.S. PATENT DOCUMENTS

| 4,384,902 A | 5/1983 | Crotty et al. |
| 4,659,395 A | 4/1987 | Sugama et al. |
| 5,175,361 A * | 12/1992 | Denzinger et al. .......... 562/590 |
| 5,683,816 A * | 11/1997 | Goodreau .................... 428/461 |
| 6,537,387 B1 | 3/2003 | Riesop |
| 6,653,384 B1 | 11/2003 | Ishii et al. |
| 6,761,933 B2 * | 7/2004 | Warburton et al. .......... 427/410 |
| 2002/0011281 A1 * | 1/2002 | Geke et al. .................. 148/260 |
| 2002/0084002 A1 * | 7/2002 | Hardin et al. ................ 148/243 |
| 2002/0146515 A1 * | 10/2002 | Schwartz et al. ............ 427/409 |
| 2004/0009300 A1 | 1/2004 | Shimakura et al. |
| 2005/0163933 A1 | 7/2005 | Dietsche et al. |
| 2007/0176149 A1 | 8/2007 | Dietsche et al. |

FOREIGN PATENT DOCUMENTS

| DE | 19516765 A1 | 11/1996 |
| DE | 197 49508 | 5/1999 |
| DE | 19754108 A1 | 6/1999 |
| DE | 10128204 A1 | 12/2002 |
| DE | 10351157 A1 | 7/2005 |
| JP | 55 044 552 | 3/1980 |
| JP | 2002 254 583 | 9/2002 |
| WO | WO-0055391 A1 | 9/2000 |
| WO | WO-2004/074372 | 9/2002 |
| WO | WO-2004000208 A2 | 12/2003 |
| WO | WO-2004074372 A1 | 9/2004 |
| WO | WO-2005004801 A2 | 1/2005 |
| WO | WO-2005061105 A1 | 7/2005 |
| WO | WO-2005061106 A1 | 7/2005 |

* cited by examiner

Primary Examiner—Melvin C Mayes
Assistant Examiner—Stefanie Cohen
(74) Attorney, Agent, or Firm—Connolly Bove Lodge & Hutz LLP

(57) ABSTRACT

Process for the passivation of metallic surfaces by treatment of the surface with an acidic, aqueous preparation which comprises at least one water-soluble acid group-containing polymer and Zn, Ca, Mg or Al ions, said process being in particular a continuous process for the passivation of strip metals.

20 Claims, No Drawings

METHOD FOR THE PASSIVATION OF METAL SURFACES WITH POLYMERS CONTAINING ACID GROUPS

RELATED APPLICATIONS

This application is a national stage application (under 35 U.S.C. 371) of PCT/EP2006063168 filed Jun. 13, 2006, which claims benefit of German application 102005027567.2 filed Jun. 14, 2005.

DESCRIPTION

The present invention relates to a process for the passivation of metallic surfaces by treatment of the surface with an acidic, aqueous preparation which comprises at least one water-soluble acid group-containing polymer, Zn, Ca, Mg or Al ions and phosphate ions. The process is suitable in particular for the continuous passivation of strip metals.

Nowadays, long metal strips which are produced by hot rolling and/or cold rolling of metal blocks (so-called "slabs") and are wound into coils for storage and transportation are usually used as raw material for the production of sheet-like metallic workpieces, such as, for example, automotive parts, bodywork parts, equipment linings, facade claddings, ceiling claddings or window profiles.

The metal strips are divided and are shaped into the desired shaped articles by means of suitable techniques, such as punching, drilling, folding, conversion into profiles and/or deep drawing. Larger components, such as, for example, automotive bodyworks, are, if appropriate, joined by welding of a plurality of individual parts.

The corrosion protection treatment of such metallic materials is usually effected in multistage processes, and the surface of treated metals has a plurality of different layers. A corrosion protection treatment can be carried out at various points of the production process. This may be temporary corrosion protection as well as permanent corrosion protection. Temporary protection is applied, for example, only for storage and transportation of a metal strip or another metallic workpiece and is removed again before the final processing.

Of particular technical and economic importance are strips having a galvanized surface, in particular strips of electrogalvanized or hot-galvanized iron or steel. The corrosion protection of the zinc is based on the fact that it is less noble than the metallic material itself and therefore initially corrodes itself. The metallic material per se remains intact as long as it is still continuously covered with zinc. Furthermore of importance are metal strips of aluminum or aluminum alloys. In the presence of atmospheric oxygen, a thin oxide layer initially forms on the surface of the Zn or Zn alloys or Al or Al alloys and, depending on the external conditions, slows down to a greater or lesser extent the corrosive attack on the underlying metal.

In order to enhance the protective effect of such an oxide layer, Al and Zn surfaces are as a rule subjected to an additional passivation treatment. In the course of such a treatment, a part of the metal to be protected dissolves and is at least partly incorporated into a film on the metal surface. This film resembles the oxide film in any case present and as a rule comprises deliberately introduced phosphate, heavy metals and/or fluorides. It provides greater protection against corrosion than the film which adheres naturally to the zinc and predominantly comprises zinc oxide and zinc carbonate and is usually referred to as a passivation layer. It frequently also improves the adhesion of paint coats applied to the metal. Instead of the term "passivation layer" the term "conversion layer" is therefore frequently used synonymously, sometimes also the term "pretreatment layer". A passivation layer applied to strip steel immediately after galvanizing is occasionally also referred to as "aftertreatment layer". Passivation layers are comparatively thin and usually have a thickness of not more than 3 μm.

For enhancing the corrosion protection, as a rule addition (paint) coats are applied to the passivation layer. In general, these are a combination of a plurality of paint coats which in each case serve different purposes. They serve, for example, for protecting the passivation layer and the metal from corrosive gases and/or liquids but also from mechanical damage, such as, for example, stonechip, and of course also for aesthetic purposes. Paint coats are usually substantially thicker than passivation layers. Typical thicknesses range from 4 μm to 400 μm.

To date, passivation layers on zinc or aluminum surfaces have usually been obtained by treatment of the workpiece to be protected with aqueous, acidic solutions of solutions which comprise chromates. The mechanism of such a passivation is complex. Inter alia, metallic Zn or Al is dissolved from the surface and is precipitated again in the form of amorphous or crystalline layers which, in addition to zinc or aluminum, are doped with Cr(III) and/or Cr(VI). However, the layers may also comprise foreign ions and/or further components from the treatment solution, such as, for example, phosphates. In the treatment with chromic acid, it is in particular desirable for a certain proportion of Cr(VI) also to be incorporated into the passivation layer.

In order to avoid the treatment with Cr(VI) solutions, the treatment with acidic, aqueous Cr(III) solutions has been proposed. Reference may be made by way of example to U.S. Pat. No. 4,384,902 or WO/40208. However, there are increasingly applications which require completely chromium-free passivation processes, for example owing to statutory provisions which relate to the construction of automobiles and electrical equipment or because of the customers' wish reliably to rule out contact of foods with certain heavy metal compounds. For avoiding the use of Cr(VI) as well as Cr(III), the use of polymers is therefore becoming increasingly important. Furthermore, for toxicological and/or ecological reasons there is the desire to dispense with cobalt, hydrofluoric acid, fluorides and hexafluorometallates in the pretreatment of metal surfaces.

DE-A 195 16 765 discloses a chromium- and fluoride-free process for the production of conversion layers on metallic surfaces of Zn or Al. The acidic solution used for the passivation comprises a water-soluble polymer, phosphoric acid and Al chelate complexes. Optionally, polymers and co(polymers) of (meth)acrylic acid may also be used.

DE-A 197 54 108 discloses a chromium-free aqueous corrosion inhibitor which comprises hexafluoro anions of Ti(IV) and/or Zr(IV), vanadium ions, cobalt ions and phosphoric acid. Optionally, various film-forming polymers may furthermore be added, including copolymers containing carboxyl groups such as acrylic acid/maleic acid copolymers.

WO 2004/74372 discloses a process for the passivation of metal surfaces using copolymers of from 50 to 99.9% by weight of (meth)acrylic acid and from 0.1 to 50% by weight of acidic comonomers, including ethylenically unsaturated dicarboxylic acids and/or polymerizable phosphoric and/or phosphonic acids. The combination of the polymers with zinc, Ca, Mg or Al ions is not disclosed.

WO 00/55391 discloses the use of vinylphosphonic acid homo- or copolymers in combination with $SiO_2$ for the treatment of metallic surfaces. The combination of the polymers with zinc, Ca, Mg or Al ions is not disclosed.

It was an object of the invention to provide an improved process for the passivation of metallic surfaces. Preferably, this was to be a chromium-free process which can be used for the treatment of strip metals and shaped articles to be produced from strip metals. The process was furthermore preferably to be fluoride-free, nickel-free and cobalt-free and to be capable of being carried out without washing of the strip in one step, i.e. by application of a formulation and subsequent drying.

Accordingly, a process for the passivation of metallic surfaces by treatment of the surface with an acidic, aqueous preparation which comprises at least one water-soluble polymer X comprising acidic groups and at least one metal ion,
the polymer X having at least 0.6 mol of acid groups/100 g of the polymer,
the pH of the formulation being not more than 5,
the amount of the polymer X being from 1 to 40% by weight, based on the amount of all components of the formulation,
the metal ion being at least one selected from the group consisting of $Zn^{2+}$, $Ca^{2+}$, $Mg^{2+}$ and $Al^{3+}$, and
the amount of the metal ions being from 0.01% by weight to 25% by weight, based on the polymer X,
was found.

In a preferred embodiment of the invention the formulation furthermore comprises phosphate ions.

In a particularly preferred embodiment of the invention, the polymer X is a copolymer X1 which contains carboxyl groups and is composed of the following monomeric units—based in each case on the amount of all monomers incorporated as polymerized units in the copolymer:
(A) from 40 to 90% by weight of (meth)acrylic acid,
(B) from 10 to 60% by weight of at least one further monoethylenically unsaturated monomer which differs from (A) and has one or more acidic groups, and
(C) optionally from 0 to 30% by weight of at least one further ethylenically unsaturated monomer differing from (A) and (B).

Surprisingly, it was found that the combination described leads to substantially improved corrosion protection.

Regarding the invention, the following may be stated specifically:

The metallic surfaces which can be passivated by means of the process according to the invention, are in particular the surfaces of nonnoble metals. These may be, for example, the surface of iron, steel, Zn, Zn alloys, Al or Al alloys, Sn and Sn alloys, Mg or Mg alloys. The steels may be both low-alloy and high-alloy steels.

The process according to the invention is particularly suitable for the passivation of metallic surfaces comprising Zn, Zn alloys, Al or Al alloys. These may be the surfaces of bodies or workpieces consisting entirely of said metals or alloys. However, they may also be the surfaces of bodies coated with Zn, Zn alloys, Al or Al alloys, it being possible for the bodies to consist of other materials, for example of other metals, alloys, polymers or composite materials. In particular, they may be the surface of galvanized iron or steel. The term "galvanized" does of course also comprise coating with a zinc alloy, in particular hot-galvanizing with ZnAl alloys and electrolytic galvanizing with ZnNi, ZnFe, AlMn and ZnCo alloys.

Zn or Al alloys are known to the person skilled in the art. The person skilled in the art chooses the type and amount of alloy constituents according to the desired use. Typical constituents of zinc alloys comprise in particular, Al, Mg, Pb, Si, Mg, Sn, Cu or Cd. Al/Zn alloys in which Al and Zn are present in approximately equal amounts are also possible. The coating may be substantially homogeneous coatings or coatings having concentration gradients. A possible example of this is galvanized steel to which Mg was additionally applied by vapor deposition. As a result, a Zn/Mg alloy may form on the surface. Typical constituents of aluminum alloys comprise in particular Mg, Mn, Si, Zn, Cr, Zr, Cu or Ti.

A preferred embodiment of the process relates to the surface of a strip metal, preferably comprising aluminum or aluminum alloys or iron or steel, in particular strips of electrogalvanized or hot-galvanized steel.

Furthermore, the surfaces are preferably those of shaped bodies which are obtainable from said strip metals by processing procedures such as cutting, working and/or joining. Examples comprise automotive bodyworks or parts thereof, truck bodyworks, linings for household appliances, such as, for example, washing machines, dishwashers, washer-dryers, gas and electric cookers, microwave ovens, chest freezers or refrigerators, linings for technical equipment or apparatuses, such as, for example, machines, switch cabinets, computer housings or the like, components in the architectural sector, such as wall parts, facade elements, ceiling elements, window or door profiles or partitions, furniture comprising metallic materials, such as metal cabinets or metal shelves.

The metallic surfaces to be treated can of course also have thin oxidic/hydroxidic and/or carbonatic surface layers or layers of similar composition. Such layers usually form spontaneously on metallic surfaces in contact with the atmosphere and are included in the term "metallic surface".

The preparation used for the passivation comprises one or more water-soluble polymers X containing acid groups. The polymers X used may be homopolymers or copolymers. In the course of the treatment, the chemical nature of the metal surface changes.

The acidic groups are preferably selected from the group consisting of carboxyl groups, sulfo groups, phosphoric acid groups or phosphonic acid groups. They are particularly preferably carboxyl groups, phosphoric acid groups or phosphonic acid groups.

According to the invention, the polymers X used have at least 0.6 mol of acid groups/100 g of the polymer. This stated amount relates to the free acid groups. Preferably, the polymers have at least 0.9 mol of acid groups/100 g, particularly preferably at least 1 mol/100 g, very particularly preferably at least 1.2 mol/100 g.

The term water-soluble in the context of this invention is intended to mean that the polymer or polymers X used should be homogeneously water-soluble. Aqueous dispersions of crosslinked polymer particles of essentially water-insoluble polymers as polymer X are not within the scope of this invention.

The acid group-containing polymers X used should preferably be continuously miscible with water, even if this is not absolutely essential in every case. However, they must be water-soluble at least to a degree such that the passivation by means of the process according to the invention is possible. As a rule, the copolymers used should have a solubility of at least 50 g/l, preferably 100 g/l and particularly preferably at least 200 g/l.

It is known to the person skilled in the art in the area of polymers that the solubility of acid group-containing polymers in water may be dependent on the pH. The pH desired for the respective intended use should therefore be chosen in each case as a reference point. A polymer which has insufficient solubility for the intended use at a certain pH may have a sufficient solubility at another pH.

The polymer X used is preferably a copolymer of at least two different acid group-containing monomers. For example, it may be a copolymer of (meth)acrylic acid and other acidic monomers, such as maleic acid, itaconic acid and/or vinylphosphonic acid. The copolymer may furthermore optionally comprise further monomers without acid-containing groups. The amount of such monomers should, however, not exceed 30% by weight, based on the total amount of all monomers incorporated as polymerized units into the copolymer.

In a particularly preferred embodiment of the invention, the polymer X is one or more water-soluble copolymers X1 comprising (meth)acrylic acid units (A), monoethylenically unsaturated monomers differing therefrom and having acidic groups (B) and optionally further monomers (C) as structural units.

The monomer (A) for the preparation of the copolymer X1 is (meth)acrylic acid. It is of course also possible to use mixtures of acrylic acid and methacrylic acid.

The amount of (meth)acrylic acid in the copolymer X1 is from 40 to 90% by weight, preferably from 50 to 80% by weight and particularly preferably from 50 to 70% by weight, these data being based on the sum of all monomers in the polymer.

The monomer (B) is at least one monoethylenically unsaturated monomer which differs from (A) but is copolymerizable with (A) and has one or more acidic groups. It is of course also possible to use a plurality of different monomers (B).

The acidic groups may be, for example, carboxyl groups, phosphoric acid groups, phosphonic acid groups or sulfo groups, without it being intended to limit the invention to these acid groups.

Examples of such monomers comprise crotonic acid, vinylacetic acid, $C_1$-$C_4$ monoesters of monoethylenically unsaturated dicarboxylic acids, styrenesulfonic acid, vinylsulfonic acid, vinylphosphonic acid, monovinyl phosphate, maleic acid or fumaric acid.

The amount of the monomers (B) in the copolymer X1 is from 10 to 60% by weight, preferably from 20 to 50% by weight and particularly preferably from 30 to 50% by weight, based in each case on the sum of all monomers in the polymer.

In a preferred embodiment of the invention, the monomers (B) are monoethylenically unsaturated dicarboxylic acids having 4 to 7 carbon atoms (B1) and/or monoethylenically unsaturated phosphoric and/or phosphonic acids (B2).

Examples of monomers (B1) comprise maleic acid, fumaric acid, methylfumaric acid, methylmaleic acid, dimethylmaleic acid, methylenemalonic acid or itaconic acid. The monomers can, if appropriate, also be used in the form of the corresponding cyclic anhydrides. Maleic acid, fumaric acid and itaconic acid are preferred, and maleic acid and maleic anhydride are particularly preferred.

Examples of monomers (B2) comprise vinylphosphonic acid, monovinyl phosphate, allylphosphonic acid, monoallyl phosphate, 3-butenylphosphonic acid, mono-3-butenyl phosphate, 4-vinyloxybutyl phosphate, phosphonoxyethyl acrylate, phosphonoxyethyl methacrylate, mono(2-hydroxy-3-vinyloxypropyl) phosphate, (1-phosphonoxymethyl-2-vinyloxyethyl) phosphate, mono(3-allyloxy-2-hydroxypropyl) phosphate, mono-2-(allyloxy-1-phosphonoxymethylethyl) phosphate, 2-hydroxy-4-vinyloxymethyl-1,3,2-dioxaphosphol, 2-hydroxy-4-allyloxymethyl-1,3,2-dioxaphosphol. They are preferably vinylphosphonic acid, monovinyl phosphate or allylphosphonic acid, and vinylphosphonic acid is particularly preferred.

In addition to the monomers (A) and (B), optionally from 0 to 30% by weight of at least one further ethylenically unsaturated monomer (C) differing from (A) and (B) may be used. Over and above this, no other monomers are used.

The monomers (C) serve for fine control of the properties of the copolymer X1. It is of course also possible to use a plurality of different monomers (C). They are chosen by the person skilled in the art according to the desired properties of the copolymer and furthermore with the proviso that they must be copolymerizable with the monomers (A) and (B).

As in the case of (A) and (B), they are preferably monoethylenically unsaturated monomers. In particular cases, however, small amounts of monomers having a plurality of polymerizable groups can also be used. As a result of this, the copolymer can be crosslinked to a small extent.

Examples of suitable monomers (C) comprise in particular alkyl esters or hydroxyalkyl esters of (meth)acrylic acid, such as methyl (meth)acrylate, ethyl (meth)acrylate, butyl (meth)acrylate, 2-ethylhexyl (meth)acrylate, hydroxyethyl (meth)acrylate, hydroxypropyl (meth)acrylate or butanediol 1,4-monoacrylate. Furthermore suitable are vinyl or allyl ethers, such as, for example, methyl vinyl ether, ethyl vinyl ether, propyl vinyl ether, 2-ethylhexyl vinyl ether, vinyl cyclohexyl ether, vinyl-4-hydroxybutyl ether, decyl vinyl ether, 2-(diethylamino)ethyl vinyl ether, 2-(di-n-butylamino)ethyl vinyl ether or methyldiglycol vinyl ether or the corresponding allyl compounds. It is also possible to use vinyl esters, such as, for example, vinyl acetate or vinyl propionate. Basic comonomers, for example acrylamide and alkyl-substituted acrylamides, may also be used. Alkoxylated monomers, in particular ethoxylated monomers, may also be used. Alkoxylated monomers which are derived from acrylic acid or methacrylic acid are particularly suitable.

Examples of crosslinking monomers comprise molecules having a plurality of ethylenically unsaturated groups, for example, di(meth)acrylates, such as ethylene glycol di(meth)acrylate or butanediol 1,4-di(meth)acrylate, or poly(meth)acrylates such as trimethylolpropane tri(meth)acrylate, or di(meth)acrylates of oligo- or polyalkylene glycols, such as di-, tri- or tetraethylene glycol di(meth)acrylate. Further examples comprise vinyl (meth)acrylate or butanediol divinyl ether.

The amount of all monomers (C) used together is from 0 to 30% by weight, based on the total amount of monomers used. Preferably, the amount is from 0 to 20% by weight, particularly preferably from 0 to 10% by weight. If crosslinking monomers (C) are present the amount thereof should as a rule not exceed 5%, preferably 2% by weight, based on the total amount of all monomers used for the process. It may be, for example, from 10 ppm to 1% by weight.

In a particularly preferred embodiment of the invention, the copolymer X1 comprises, in addition to (A), at least one monomer (B1) and at least one monomer (B2). Furthermore, particularly preferably no further monomers (C) are present in addition to the monomers (A), (B1) and (B2).

Copolymers X1 of monomers (A), (B1) and (B2) are preferred for carrying out the present invention, the amount of (A) being from 50 to 90% by weight, the amount of (B1) being from 5 to 45% by weight, the amount of (B2) being from 5 to 45% by weight and the amount of (C) being from 0 to 20% by weight. (B1) and (B2) may in each case be only one monomer (B1) or (B2) or may in each case be two or more different monomers (B1) or (B2).

Particularly preferably, the amount of (A) is from 50 to 80% by weight, the amount of (B1) is from 12 to 42% by weight, the amount of (B2) is from 8 to 38% by weight and the amount of (C) is from 0 to 10% by weight.

Very particularly preferably, the amount of (A) is from 50 to 70% by weight, the amount of (B1) is from 15 to 35% by weight, the amount of (B2) is from 15 to 35% by weight and the amount of (C) is from 0 to 5% by weight.

Particularly preferably, said copolymer X1 is a copolymer X1 of acrylic acid, maleic acid and vinylphosphonic acid in the amounts mentioned above.

The components (A), (B) and optionally (C) can be polymerized with one another in a manner known in principle. Corresponding polymerization techniques are known to the person skilled in the art. Preferably, the copolymers are prepared by free radical polymerization of said components (A), (B) and optionally (C) in aqueous solution. In addition, small amounts of water-miscible organic solvents may also be present, and, if appropriate, small amounts of emulsifiers. Details for carrying out a free radical polymerization are known to the person skilled in the art.

In the case of the acidic monomers, in each case the free acids can be used for the preparation of the copolymers X1. However, the preparation of the polymers can also be effected by using for the polymerization in the case of the acidic monomers not the free acids but in the form of their esters, anhydrides or other hydrolyzable derivatives. These may hydrolyze in the course of or after the polymerization in aqueous solution to give the corresponding acid groups. In particular, maleic acid or other cis-dicarboxylic acids can advantageously be used as cyclic anhydrides. These hydrolyze as a rule very rapidly in aqueous solution to give the corresponding dicarboxylic acids. Other acidic monomers, in particular the monomers (A) and (B2), are preferably used as free acids.

The polymerization can furthermore also be carried out in the presence of at least one base. This makes it possible in particular to improve the incorporation of monomers (B1), such as, for example, maleic acid, into the polymer so that the proportion of dicarboxylic acids not incorporated in the form of polymerized units is kept low.

Suitable bases for the neutralization are in particular ammonia, amines, aminoalcohols or alkali metal hydroxides. It is of course also possible to use mixtures of different bases. Preferred amines are alklyamines having up to 24 carbon atoms and amino alcohols which have up to 24 carbon atoms and structural units of the type —N—$C_2H_4$—O— and —N—$C_2H_4$—OH and —N—$C_2H_4$—O—$CH_3$. Examples of such amino alcohols comprise ethanolamine, diethanolamine, triethanolamine and their methylated derivatives. The bases can be added before or during the polymerization. It is of course also possible to polymerize without bases and optionally to add base after the polymerization. As a result of this, the pH of the polymer can be optimally adjusted.

The degree of neutralization should, however, by no means be too high, but sufficient free acid groups should still be present in the polymer. Particularly good adhesion of the polymers to the metal surface is achieved by free acid groups. As a rule, not more than 40% of the acid groups present in the polymer X or copolymer X1 should be neutralized, preferably from 0 to 30 mol %, particularly preferably from 0 to 20 mol % and very particularly preferably from 0 to 12 mol % and for example from 2 to 10 mol %.

The free radical polymerization is preferably initiated by the use of suitable thermally activatable polymerization initiators.

The initiators used can in principle be all compounds decomposing into free radicals under the polymerization conditions. Among the thermally activatable polymerization initiators, initiators having a decomposition temperature in the range of from 30 to 150° C., in particular from 50 to 120° C., are preferred. These temperature data relate as usual to the 10 h half-life.

The person skilled in the art makes a suitable choice from the initiators which are suitable in principle. The free radical initiators should be soluble to a sufficient extent in the solvent of the reaction. If only water is used as the solvent the initiators should have sufficient water solubility. If the procedure is effected in organic solvents or mixtures of water and organic solvents, it is also possible to use initiators soluble in organic media. Water-soluble initiators are preferably used.

Examples of suitable initiators comprise inorganic peroxo compounds, such as peroxodisulfates, in particular ammonium, potassium and preferably sodium peroxodisulfate, peroxosulfates, hydroperoxides, percarbonates and hydrogen peroxide and the so-called redox initiators. In some cases, it is advantageous to use mixtures of different initiators, for example, mixtures of hydrogen peroxide and sodium or potassium peroxodisulfate. Mixtures of hydrogen peroxide and sodium peroxodisulfate can be used in any desired ratio.

Furthermore, organic peroxo compounds such as diacetyl peroxide, di-tert-butyl peroxide, diamyl peroxide, dioctanoyl peroxide, didecanoyl peroxide, dilauroyl peroxide, dibenzoyl peroxide, bis(o-toloyl) peroxide, succinyl peroxide, tert-butyl peracetate, tert-butyl permaleate, tert-butyl perisobutyrate, tert-butyl perpivalate, tert-butyl peroctanoate, tert-butyl perneodecanoate, tert-butyl perbenzoate, tert-butyl peroxide, tert-butyl hydroperoxide (water-soluble), cumyl hydroperoxide, tert-butyl peroxy-2-ethylhexanoate and diisopropyl peroxidicarbamate, can also be used.

Other preferred initiators are azo compounds. Examples of suitable water-soluble azo compounds comprise 2,2'-azobis [2-(5-methyl-2-imidazolin-2-yl)propane] dihydrochloride, 2,2'-azobis[2-(2-imidazolin-2-yl)propane disulfate dihydrate, 2,2'-azobis [N-(2-carboxyethyl)-2-methylpropionamidine] tetrahydrate, 2,2'-azobis{2-[1-(2-hydroxyethyl)-2-imidazolin-2-yl]propane} dihydrochloride, 2,2'-azobis{2-methyl-N-[1,1-bis(hydroxymethyl)-2-hydroxyethyl] propionamide, 2,2'-azobis[2-methyl-N-(2-hydroxyethyl) propionamide], 2,2'-azobis[2-(2-imidazolin-2-yl)propane] dihydrochloride, 2,2'-azobis(2-methylpropionamide)dihydrochloride, 2,2'-azobis[2-(3,4,5,6-tetrahydropyrimidin-2-yl)propane] dihydrochloride, 2,2'-azobis[2-(2-imidazolin-2-yl)propane], 2,2'-azobis{2-methyl-N-[2-(1-hydroxybutyl)] propionamide}.

Examples of azo compounds soluble in organic solvents comprise 2,2'-azobis(4-methoxy-2,4-dimethyl valeronitrile), dimethyl 2,2'-azobis(2-dimethylpropionate), 1,1'-azobis(cyclohexane-1-carbonitrile), 1-[(cyano-1-methylethyl)azo]formamide, 2,2'-azobis(N-cyclohexyl-2-methylpropionamide), 2,2'-azobis(2,4-dimethyl valeronitrile), 2,2'-azobis(2-methylbutyronitrile), 2,2'-azobis[N-(2-propenyl)-2-methylpropionamide], 2,2'-azobis(N-butyl-2-methylpropionamide).

Further preferred initiators are redox initiators. Redox initiators comprise at least one of the abovementioned peroxo compounds as the oxidizing component and, for example, ascorbic acid, glucose, sorbose, ammonium or alkali metal hydrogen sulfite, sulfite, thiosulfate, hyposulfite, pyrosulfite or sulfide or sodium hydroxymethylsulfoxylate as the reducing component. Preferably, ascorbic acid or sodium pyrosulfite is used as the reducing component of the redox catalyst. Based on the amount of monomers used in the polymerization, for example, from $1 \times 10^{-5}$ to 1 mol % of the reducing component of the redox catalyst is used.

In combination with the initiators or redox initiator systems, transition metal catalysts may additionally be used, for example salts of iron, cobalt, nickel, copper, vanadium and manganese. Suitable salts are, for example, iron(II) sulfate, cobalt(II) chloride, nickel(II) sulfate, copper(I) chloride. The reducing transition metal salt is usually used in an amount of from 0.1 to 1000 ppm, based on the sum of the monomers. For example, combinations of hydrogen peroxide and iron(II) salts are particularly advantageous, such as a combination of from 0.5 to 30% by weight of hydrogen peroxide in from 0.1 to 500 ppm of $FeSO_4.7\ H_2O$, based in each case of the sum of the monomers.

Of course, it is also possible to use mixtures of different initiators provided that they do not have an adverse affect on one another. The amount is determined by the person skilled in the art according to the desired copolymer. As a rule, from 0.05% by weight to 30% by weight, preferably from 0.1 to 15% by weight and particularly preferably from 0.2 to 8% by weight of the initiator, based on the total amount of all monomers, are used.

In a manner known in principle, it is also possible to use suitable regulators, such as, for example, mercaptoethanol. Preferably, no regulators are used.

Thermal initiators are preferably used, water-soluble azo compounds and water-soluble peroxo compounds being preferred. Hydrogen peroxide and sodium peroxodisulfate or mixtures thereof, if appropriate in combination with from 0.1 to 500 ppM of $FeSO_4.7\ H_2O$, are very particularly preferred. However, the polymerization can alternatively also be initiated, for example, by suitable radiation. Examples of suitable photoinitiators comprise acetophenone, benzoin ethers, benzyl dialkyl ketones and derivatives thereof.

The free radical polymerization is preferably carried out at a temperature of less than 130° C. Apart from this, the temperature can be varied by the person skilled in the art within wide limits depending on the type of monomers used, type of initiator and the desired copolymer. A minimum temperature of 60° C. has proven useful here. The temperature can be kept constant during the polymerization or temperature profiles may also be used. The polymerization temperature is preferably from 75 to 125° C., particularly preferably from 80 to 120° C., very particularly preferably from 90 to 110° C. and, for example from 95 to 105° C.

The polymerization can be carried out in conventional apparatuses for free radical polymerization. If the procedure is effected at above the boiling point of water or of the mixture of water and further solvents, a suitable pressure vessel is employed; otherwise the procedure can be effected at atmospheric pressure.

The copolymers X1 synthesized can be isolated from the aqueous solution by means of conventional methods known to the person skilled in the art, for example by evaporating down the solution, spray-drying, freeze-drying or precipitation. However, the copolymers X1 are preferably not isolated at all from the aqueous solution after the polymerization, but the resulting solutions of the copolymers are used as such for the process according to the invention.

For carrying out the process according to the invention, an acidic, aqueous preparation Z1 of the polymers X is used. This can of course be a mixture of a plurality of different polymers X. Copolymers X1 are preferred.

The molecular weight $M_w$ (weight average) of the polymers X used for the process according to the invention is determined by the person skilled in the art according to the desired use. For example, polymers having a molecular weight $M_w$ of from 3000 to 1 000 000 g/mol may be used. Polymers of from 5000 g/mol to 500 000 g/mol, preferably from 10 000 g/mol to 250 000 g/mol, particularly preferably from 15 000 to 100 000 g/mol and very particularly preferably from 20 000 to 75 000 g/mol have proven particularly useful.

The preparation preferably comprises only water as the solvent. It may also comprise water-miscible organic solvents. Examples comprise monoalcohols, such as methanol, ethanol or propanol, higher alcohols, such as ethylene glycol, or polyether polyols and ether alcohols, such as butyl glycol or methoxypropanol, and N-methylpyrrolidone. As a rule, the amount of water is, however, at least 80% by weight, preferably at least 90% by weight and very particularly preferably at least 95% by weight. The data are based in each case on the total amount of all solvents.

Advantageously, the polymer-containing solutions which result from the polymerization can be directly used, which solutions, if appropriate, are further diluted. In order to facilitate such direct further use, the amount of aqueous solvent used for the polymerization should from the outset be such that the concentration of the polymer in the solvent is suitable for the application.

The concentration of the polymers X in the preparation Z1 is from 1 to 40% by weight, based on the amount of all components of the formulation. Preferably, the amount is from 2 to 35% by weight and particularly preferably from 5 to 25% by weight. The properties of the preparation, for example, the viscosity thereof or the pH thereof, can be influenced by the concentration and the type of polymers used. The properties of the preparation can thus be optimally adapted to a certain process technique for the treatment. Thus, a concentration of from 5 to 15% by weight has proven useful, for example, in the case of a squeegee technique, and a concentration of from 15 to 25% by weight in the case of application by means of coating rolls. The stated concentrations are based on the ready-to-use preparation. It is also possible initially to prepare a concentrate which is diluted to the desired concentration with water or optionally other solvent mixtures only on site.

The preparation Z1 used according to the invention has a pH of not more than 5, in particular a pH of from 0.5 to 5, preferably from 1.5 to 3.5. The pH of the preparation can be controlled, for example, by the type and concentration of the polymers used according to the invention. Of course, the degree of neutralization of the polymer plays a decisive role here.

The preparation furthermore comprises at least one dissolved metal ion selected from the group consisting of $Zn^{2+}$, $Mg^{2+}$, $Ca^{2+}$ or $Al^{3+}$. The ions may be present as hydrated metal ions, but they may also be present in the form of dissolved compounds, for example as complex compounds. In particular, the ions may have complex bonds to the acidic groups of the polymer. The metal ions are in particular at least one metal ion selected from the group consisting of $Zn^{2+}$, $Mg^{2+}$ or $Ca^{2+}$. They are preferably $Zn^{2+}$ or $Mg^{2+}$ and very particularly preferably $Zn^{2+}$. The preparation preferably comprises no further metal ions.

If further metal ions or metal compounds are also to be present, however, the preparations are preferably those which comprise no chromium compounds. Furthermore, preferably no metal fluorides or complex metal fluorides should be present. The passivation according to the invention is therefore preferably a chromium-free passivation, particularly preferably a chromium- and fluoride-free passivation.

Furthermore, preferably no heavy metal ions apart from those of zinc and iron, in particular no ions of nickel, of manganese and of cobalt, are used in the process according to the invention.

The amount of metal ions from the group consisting of $Zn^{2+}$, $Mg^{2+}$, $Ca^{2+}$ or $Al^{3+}$ is from 0.01% by weight to 25% by weight, preferably from 0.5 to 20% by weight, particularly preferably from 1 to 15% by weight and very particularly preferably from 3 to 12% by weight, based in each case on the total amount of all polymers X in the formulation.

In a preferred embodiment of the invention, the formulation furthermore comprises at least one dissolved phosphate ion. Said ion may be all types of phosphate ions. For example, said ions may be the orthophosphates or diphosphates. For the person skilled in the art, it is clear that an equilibrium may be present between the different dissociation states of the ions in aqueous solution, depending on pH and concentration.

In a further, preferred embodiment of the invention, the can furthermore comprise methanesulfonate ions.

If phosphate ions are present, the metal ions and phosphate ions can preferably be used according to the invention in the form of soluble salts, both of which comprise ions. Examples of such compounds comprise $Zn_3(PO_4)_2$, $ZnH_2PO_4$, $Mg_3(PO_4)_2$ or $Ca(H_2PO_4)_2$ or corresponding hydrates thereof.

The metal ions and phosphate ions can, however, also be added separately from one another. For example, the metal ions can be used in the form of the corresponding nitrates, alkanesulfonates or carboxylates, for example acetates and the phosphates can be used in the form of phosphoric acid. It is also possible to use insoluble or sparingly soluble compounds, such as, for example, the corresponding carbonates, oxides, hydrated oxides or hydroxides, which are dissolved under the influence of acid.

Analogously, metal ions and methanesulfonate ions can be used together as metal salts of methanesulfonic acid, such as, for example, as $Zn(CH_3SO_3)_2$, or separately in the form of other metal salts and methanesulfonic acid.

The amount of the phosphate ions and/or methanesulfonate ions in the formulation is determined by the person skilled in the art according to the desired properties of the formulation. If present, said amount is as a rule from 0.01% by weight to 25% by weight, preferably from 0.5 to 25% by weight, particularly preferably from 1 to 25% by weight and very particularly preferably from 5 to 25% by weight, calculated in each case as orthophosphoric acid and based in each case on the polymers X.

The particular advantage of the present process is that outstanding results are achieved even with preparations which comprise only the components described. The preparation can, however, optionally comprise further components over and above said components.

Inorganic or organic acids or mixtures thereof may be mentioned in particular as further components. The choice of such an acid is not limited provided that there are no adverse effects together with the other components of the formulation. The person skilled in the art makes an appropriate choice.

Examples of suitable acids comprise phosphoric acid, phosphonic acid or organic phosphonic acids, such as 1-hydroxyethane-1,1-diphosphonic acid (HEDP), 2-phosphonobutane-1,2,4-tricarboxylic acid (PBTC), aminotri(methylenephosphonic acid) (ATMP), ethylenediaminetetra (methylenephosphonic acid) (EDTMP) or diethylenetriaminepenta(methylenephosphonic acid) (DTPMP), sulfonic acids, such as methanesulfonic acid, amidosulfonic acid, p-toluenesulfonic acid, m-nitrobenzenesulfonic acid and derivatives thereof, nitric acid, formic acid, or acetic acid. Phosphorous-containing acids, such as $H_3PO_4$, phosphonic acid, said organic phosphonic acids, $HNO_3$ or methanesulfonic acid are preferred. $H_3PO_4$ is particularly preferred. If an additional acid is present at all, the formulation very particularly preferably comprises exclusively $H_3PO_4$ as the acid.

Methanesulfonic acid is furthermore particularly preferred as the acid, in particular for use in formulations which comprise $Al^{3+}$ ions.

The preparation can optionally furthermore comprise at least one wax dispersed in the formulation. It is of course also possible to use mixtures of different waxes. The term "wax" here comprises both the actual wax and assistants used if appropriate for the formation of a wax dispersion. Waxes for use in aqueous dispersions are known to the person skilled in the art, who makes a suitable choice. The waxes may be, for example, montan waxes, polyethylene waxes, waxes based on oxidized polyethylene, those based on fluorinated polyethylene, such as PTFE or other polymers based on C, H and F. The term "polyethylene" is also intended to comprise copolymers of ethylene and other monomers, in particular other olefins, such as, for example, propylene. Preferably, such ethylene copolymers comprise at least 65% by weight of ethylene. By adding waxes, the friction between the surface and the surface of the tools used for working can advantageously be reduced.

The amount of optionally used waxes is determined by the person skilled in the art according to the desired properties of the passivation layer. As a rule, an amount of from 0.01 to 70% by weight, preferably from 0.5 to 25 and particularly preferably from 1 to 10% by weight, based in each case on the based on the acid group-containing polymer X, has proven useful.

Further optional components of the preparation comprise surface-active compounds, corrosion inhibitors, complexing agents, typical galvanization assistants or further polymers to be distinguished from the polymers X used according to the invention. Further possible additives are conventional coating additives, as described in H. Kiffel (Editor.) *Lehrbuch der Lacke und Beschichtungen, Volume 5—Pigmente, Füllstoffe und Farbmetrik*—2nd edition, S. Hirzel-Verlag, Stuttgart 2003.

The person skilled in the art makes an appropriate choice from the optional components possible in principle and with regard to their amount according to the desired use. However, the amount of optional components should as a rule be not more than 20% by weight, preferably not more than 10% by weight and particularly preferably not more than 5% by weight, based on the polymers X.

The preparations used according to the invention can be obtained by simple mixing of the components. If waxes are used, they are preferably first dispersed separately in water and mixed as a dispersion with the other components. Such wax dispersions are also commercially available.

For passivating metal surfaces, the surface of the metal is brought into contact with the preparation, for example by spraying, immersion or rolling on.

A number of possibilities exist with regard to the process technique for carrying out the passivation. These depend, inter alia, on the shape of the workpiece, for example whether a still unshaped, flat metal strip or a metal sheet or a shaped body which has, for example, curved surfaces or edges is used. The treatment may also comprise a plurality of individual process steps. Continuous or batchwise processes may be used. The person skilled in the art makes a suitable choice from the possible processes.

The treatment can be carried out, for example, by immersion in the preparation or by spraying or coating with the preparation. On metal strips and metal sheets, the preparation can preferably be rolled on. The metal strip can furthermore preferably also be passed through a tank or a spray apparatus with the preparation. Excess passivating solution can be removed by squeeze rolls and recycled to the spray apparatus. The spray apparatus may produce a continuous spray mist or the preparation may simply be dripped onto the strip. For example, customary spray means are those which consist of a tube in which openings are made at a distance of from 2 to 10 cm, through which the preparation is sprayed onto the strip. The running of the preparation and the subsequent squeegee operation then lead to a sufficient distribution of the product. Additional nozzles operated with compressed air can ensure a uniform distribution of the preparation in the edge region of the strip. A continuous process for the production of steel strips may also comprise a galvanization station followed by an apparatus for the passivation with the preparation. In the case of rolling on, as a rule the coating material is taken up from a trough by a take-up roll and then transferred to an applicator roll. The applicator roll transfers the coating material to the strip. Take-up roll and applicator roll can be coupled via a roll which is located in between and via which the coating material is transferred. The rolls may rotate in the same direction or in the opposite direction and run with or against the strip direction. The result of the coating may additionally be determined by the choice of the contact pressure of the roll on the strip and by the roughness and hardness of the roller.

After an immersion process or spray process, the workpiece can be allowed to drip off to remove excess treatment solution; in the case of metal sheets, metal foils or the like, however, excess treatment solution can, for example, also be removed by means of a squeegee or doctor blade. It is also possible to rinse the surface after the treatment with a cleaning liquid, in particular with water, in order to remove residues of the preparation used from the surface.

In an alternative embodiment, the treatment may also be a so-called "no-rinse" process in which the treatment solution is dried in directly in a drying oven immediately after the application without rinsing off.

The treatment with the preparation can be effected at room temperature or at elevated temperatures. As a rule, the treatment is effected at from 20 to 90° C., preferably from 25 to 80° C. and particularly preferably from 30 to 60° C. For this purpose, for example, a bath with the preparation can be heated, but an elevated temperature may also be automatically established by immersing warm metal a bath.

The duration of treatment is determined by the person skilled in the art according to the desired properties of the layer, the composition used for the treatment and the general technical conditions. It may be substantially less than one second or may be several minutes. In the continuous process, it has proven particularly useful to bring the surface into contact with the preparation for a duration of from 1 to 60 s.

After the treatment, the solvent used, i.e. as a rule the water, is removed. The removal can be effected at room temperature by simple evaporation in air at room temperature.

The removal of the solvent can, however, also be promoted by suitable assistants, for example by heating and/or by passing over gas streams, in particular air streams. The evaporation of the solvent can be promoted, for example, by IR lamps or, for example, by drying in a drying tunnel. A temperature of from 30° C. to 210° C., preferably from 40° C. to 120° C. and particularly preferably from 40° C. to 80° C. has proven useful for drying. What is meant thereby is the peak metal temperature (PMT), which can be measured by methods familiar to the person skilled in the art (for example, noncontact infrared measurement or determination of the temperature using adhesively bonded test strips). The drying temperature must, if appropriate, be set higher and is appropriately chosen by the person skilled in the art.

The process according to the invention may optionally also comprise one or more pretreatment steps. For example, the metallic surface can be cleaned before the passivation with a preparation used according to the invention, for example to remove fats or oils. Furthermore, it can also be pickled prior to the passivation, in order to remove oxidic deposits, scale, temporary corrosion protection and the like. Furthermore, the surface must, if appropriate, also be washed with water after and between such pretreatment steps, and to remove the residues of wash solutions or pickling solutions.

The passivation layer may additionally be crosslinked. For this purpose, a crosslinking agent may be mixed with the preparation. However, the metal may first be treated with the preparation and the layer then be treated with a suitable crosslinking agent, for example sprayed with the solution of a crosslinking agent.

Suitable crosslinking agents are water-soluble or soluble at least in said aqueous solvent mixture. Examples of suitable crosslinking agents comprise those which have at least 2 crosslinking groups selected from the group consisting of azirane, oxirane or thiirane groups. Further details on suitable crosslinking agents and the use thereof are disclosed in WO 05/042801, page 11, line 34 to page 14, line 39.

Crosslinking can also be carried out by adding to the formulation compounds which comprise more than one OH group and/or $NH_2$ group, such as, for example, alkanolamines, polyhydric alcohols, di-, oligo- and polyamines. These can crosslink on appropriate choice of the drying temperature.

By means of the process according to the invention, a passivation layer or conversion layer is obtained, in particular on a metallic surface comprising Zn, Zn alloys, Al or Al alloys. In the course of the treatment of the surface, a part of the metal to be protected dissolves and is incorporated immediately thereafter again into an oxidic film on the metal surface. By using the copolymers X with a high content of acidic groups and a low degree of neutralization, superficial dissolution takes place particularly well, and excellent corrosion protection is obtained. The exact structure and composition of the passivation layer is unknown to us. However, said layer also comprises, in addition to the conventional amorphous oxides of aluminum or of zinc and, if appropriate, further metals, the reaction products of the polymer and, if appropriate, of the crosslinking agent and/or further components of the formulation. The composition of the passivation layer is generally inhomogeneous, but the components appear to have concentration gradients.

The thickness of the passivation layer is adjusted by the person skilled in the art according to the desired properties. As a rule, the thickness is from 0.01 to 3 μm, preferably from 0.1 to 2.5 μm and particularly preferably from 0.2 to 1.5 μm.

The thickness can be influenced, for example, by the type and amount of the components applied and the contact time. Furthermore, it can be influenced by process parameters, for example by removal of excess applied treatment solution by means of a doctor blade or roll.

The thickness of the layer is determined by differential weighing before and after the action of the composition used according to the invention on the metal surface, assuming that the layer has a specific density of 1 kg/l. Below, "layer thickness" is always understood as meaning a parameter determined in this manner, regardless of the actual specific density of the layer. These thin layers are sufficient for achieving outstanding corrosion protection. The dimensional stability of the passivated workpieces is ensured by such thin layers.

The present invention furthermore relates to a metallic surface which comprises the passivation layer according to the invention. The passivation layer is applied directly to the actual metal surface. In a preferred embodiment, said metal surface is a steel strip metal which comprises a coating of Zn or of a Zn alloy and on which a passivation layer according to the invention is applied. It may furthermore be an automotive bodywork which is covered by the passivation layer according to the invention.

In a preferred embodiment of the invention, the metallic surface with the passivation layer can be overcoated in a manner known in principle with one or more color-imparting or effect-imparting paint coats. Typical paints, the composition thereof and typical such as coat sequences in the case of a plurality of paint coats are known in principle to the person skilled in the art. It is found that the passivation according to the invention improves the paint adhesion and produces undermigration protection.

The passivation according to the invention can be used at different processing stages. It can be carried out, for example, by a steel producer. Here, a steel strip can be galvanized in a continuous process and passivated immediately after the galvanization by treatment with the formulation used according to the invention. Passivation at this stage is frequently also referred to by the person skilled in the art as "aftertreatment".

This may only be a temporary passivation which serves for corrosion protection during storage and during transportation and/or in further process steps but is removed again before application of the permanent corrosion protection. The acidic copolymers can be removed again from the surface by cleaning with aqueous alkaline solutions.

However, it may also be a permanent corrosion protection treatment which remains on the strip or the finally shaped workpiece and is provided with additional paint coats. Passivation at this stage is also frequently referred to by the person skilled in the art as "pretreatment".

With the aid of the combination, according to the invention, of copolymer X and Zn, Ca, Mg or Al ions, it is possible to achieve a substantial improvement in the corrosion protection properties in the metal surfaces in comparison with a treatment with acidic polymers alone.

The following examples are intended to explain the invention in more detail:

Copolymer Used:

Acid group-containing copolymer of 60% by weight of acrylic acid, 20% by weight of maleic acid and 20% by weight of vinylphosphonic acid. The amount of acid groups is 1.37 mol/100 g of polymer. The degree of neutralization of the acid groups is about 6 mol % (neutralized with triethanolamine), $M_w$ about 25 000 g/mol.

A) Addition of Zinc Ions

A solution of the copolymer in water was used for the experiments. The amount is shown in table 1. For the examples according to the invention, in each case $Zn_3(PO_4)_2$ was used in the amounts stated in table 1 in the solution. For comparison purposes, formulations of the polymer without the addition of $Zn_3(PO_4)_2$ were used. Furthermore, an acidic zinc phosphate solution without polymer was used for comparison purposes.

The solution was applied with a coating roll to a hot-galvanized steel sheet and dried by heating. In each case two steel sheets with different layer thickness were coated.

Thereafter, the metal sheet was subjected to a salt spray test according to DIN 50017 and the quality of the corrosion protection is rated according to DIN EN ISO 10289. The rating number is a measure of the formation of white rust on the metal sheet. A high rating number represents good corrosion protection.

The results are listed in table 1.

The results show that the corrosion protection effect of the coating is substantially increased by the addition of Zn ions and phosphate ions. The effect is particularly striking in the case of prolonged action of the corrosive medium. The action of zinc and phosphate ions alone, i.e. without polymer, has virtually no effect. The zinc and phosphate ions therefore have a synergistic action together with the polymer.

B) Addition of Aluminum Ions

A solution of the abovementioned copolymer in water was used for the experiments. The concentration of the partly neutralized copolymer (i.e. including base) in the solution was 45.5% by weight (41.6% by weight without taking into account the base).

In each case $HNO_3$ or methanesulfonic acid and furthermore either $Al(NO_3)_3.9\ H_2O$ or basic aluminum acetate $Al(CH_3COO)_2OH$, in each case in the amounts stated in table 2 were added to 197 g of said solution. The solution was made up in each case to 400 g with demineralized water. For comparison purposes, formulations without aluminum ions were prepared. The concentration of the partly neutralized copolymer in the prepared corrosion protection formulation was in each case 22.5% by weight, based on the sum of all constituents of the formulation.

The compositions of the formulations used are summarized in table 2.

Hot-galvanized steel sheets were used for the test. The metal sheets were immersed in each case at room temperature for in each case 1 s in the formulations mentioned in table 2, squeezed off with a roll system and dried for 12 s at 160° C. in a drying oven. Here, the peak metal temperature did not exceed 50° C. 2 metal sheets were coated in each case.

Thereafter, in each case the condensation/cyclic climate test with alternation of atmospheric humidity and air temperature according to DIN 50017-KFW and a salt spray test according to DIN 50021-SS were carried out with the metal sheets.

The quality of the corrosion protection in the salt spray test was rated according to DIN EN ISO 10289 by awarding rating numbers from 0 to 10 according to specified standards. The rating number is a measure of the formation of white rust on the metal sheet. The higher the rating number, the lower the proportion of corroded area and the better the corrosion protection. The award of the rating numbers was effected according to the following table:

| Defect area % | Rating $R_P$ or $R_A$ |
|---|---|
| no defect | 10 |
| 0 < A ≦ 0.1 | 9 |
| 0.1 < A ≦ 0.25 | 8 |
| 0.25 < A ≦ 0.5 | 7 |
| 0.5 < A ≦ 1.0 | 6 |
| 1.0 < A ≦ 2.5 | 5 |
| 2.5 < A ≦ 5.0 | 4 |
| 5.0 < A ≦ 10 | 3 |
| 10 < A ≦ 25 | 2 |
| 25 < A ≦ 50 | 1 |
| 50 < A | 0 |

KFW:

The condensation/cyclic climate test consists of one or more climate cycles with in each case two test segments. In the first segment, the test specimens are subjected for 8 hours to a temperature of 40° C. and a relative humidity of 100%; in the second segment, said test specimens are subjected to a temperature of 18-28° C. at a relative humidity of less than 100% (ambient condition). The duration of the cycle is therefore 24 hours.

The optical assessment of the samples was effected according to the following criteria:

| | | | |
|---|---|---|---|
| 0 | no chalking | f: | slightly spotty structure |
| 1 | slight chalking | F: | substantially pronounced spotty structure |
| 2 | moderate chalking | | |
| 3 | strong chalking | WR: | white rust |
| 4 | very strong chalking | LM: | slightly mottled |
| | | M: | mottled |

The results of the tests are summarized in table 3.

The examples and comparative examples show that the corrosion protection effect of the polymers can be considerably improved by addition of metal salts (table 1). Furthermore, the condensation/cyclic climate tests show that the addition of metal salts and/or acids leads to a substantially improved optical appearance of the test specimens after stress in comparison with the results of the pure polymers (table 3).

TABLE 1

List of the results of the examples and comparative examples

| No. | Amount of polymer [% by wt.][2] | Amount of Zn [% by wt.][2] | Amount of phosphate[1] [% by wt.][2] | pH of the formulation | Coat thickness [g/m$^2$] | Rating in salt spray test (double determination) | | | | | |
|---|---|---|---|---|---|---|---|---|---|---|---|
| | | | | | | 48 h | | 72 h | | 168 h | |
| Comparative example 1 | 20 | — | — | <2.7 | 0.27 | 6 | 7 | 2 | 3 | | |
| Comparative example 2 | 20 | — | — | <2.7 | 0.42 | 7 | 7.5 | 4.5 | 6 | 1 | 1 |
| Comparative example 3 | — | 1.68 | 2.52 | <2.7 | — | <1 | <1 | — | — | — | — |
| Example 1 | 15.8 | 2.14 | 2.06 | <2.7 | 0.27 | 8 | 8 | 7 | 7 | 4 | 3 |
| Example 2 | 15.8 | 2.14 | 2.06 | <2.7 | 0.42 | 8 | 9 | 8 | 8.5 | 6.5 | 7 |

[1]calculated as $PO_4^{3-}$

[2]based in each case on the amount of all components of the formulation

TABLE 2

Composition of the formulations, all data in g, unless stated otherwise.

| | Example No. | | | | | | | | | | | |
|---|---|---|---|---|---|---|---|---|---|---|---|---|
| | C4 | C5 | 3 | 4 | 5 | 6 | C6 | C7 | 9 | 10 | 11 | 12 |
| Copolymer solution [45.5% by weight of copolymer] | 197 | 197 | 197 | 197 | 197 | 197 | 197 | 197 | 197 | 197 | 197 | 197 |
| $HNO_3$ [65%] | — | 6 | 6 | 6 | 6 | 6 | — | — | — | — | — | — |
| $CH_3SO_3H$ [70%] | — | — | — | — | — | — | 9 | 17 | 9 | 9 | 9 | 9 |
| $Al(CH_3COO)_2OH$ | — | — | — | — | 0.87 | 1.74 | — | — | — | — | 0.87 | 1.74 |
| $Al(NO_3)_3 \cdot 9H_2O$ | — | — | 2.0 | 4.0 | — | — | — | — | 2.0 | 4.0 | — | — |
| % by weight of Al based on copolymer | — | — | 0.16 | 0.32 | 0.15 | 0.29 | — | — | 0.16 | 0.32 | 0.15 | 0.29 |
| Water | 203 | 197 | 195 | 193 | 196 | 195 | 194 | 186 | 192 | 190 | 193 | 194 |
| pH | 1.38 | 0.85 | 0.78 | 0.72 | 0.87 | 0.89 | 0.86 | 0.57 | 0.79 | 0.75 | 0.90 | 0.92 |

C: Comparative examples without Al salts

TABLE 3

Results of the corrosion protection tests

| | Example No. | | | | | | | | | | | |
|---|---|---|---|---|---|---|---|---|---|---|---|---|
| | C4 | C5 | 3 | 4 | 5 | 6 | C6 | C7 | 9 | 10 | 11 | 12 |
| Acid | — | $HNO_3$ | $HNO_3$ | $HNO_3$ | $HNO_3$ | $HNO_3$ | $CH_3SO_3H$ | $CH_3SO_3H$ double amount | $CH_3SO_3H$ | $CH_3SO_3H$ | $CH_3SO_3H$ | $CH_3SO_3H$ |
| Al content, based on copolymer | — | — | 0.16 | 0.32 | 0.15 | 0.29 | — | — | 0.16 | 0.32 | 0.15 | 0.29 |
| Assessment in salt spray test (SSK): | | | | | | | | | | | | |
| Rating after 24 h | 9 | 9 | 9 | 9.5 | 9.5 | 10 | 9 | 9 | 9 | 9 | 9 | 9 |
| Rating after 48 h | 8.5 | 8 | 9 | 8.5 | 9 | 9 | 9 | 8 | 9 | 9 | 8.5 | 8 |
| Rating after 72 h | 7 | 6.5 | 7.5 | 7.5 | 8 | 8 | 8 | 6.5 | 8 | 8 | 7.5 | 7 |
| Optical rating of "chalking" according to KFW | | | | | | | | | | | | |
| Rating after one cycle | 3 | 1 f, M | 1 f, M | 1 f, M | 1 f, M | 1 M | 2 | 0.5 f | 1 f, LM | 0.5 f, LM | 1 f | 0.5 |

We claim:

1. A process for the passivation of a metallic surface which comprises treating the metallic surface with an acidic, aqueous formulation comprising at least one water-soluble polymer X comprising acidic groups and at least one metal ion, wherein
   the polymer has at least 0.6 mol of acid groups/100 g of the polymer,
   the pH of the formulation is from 0.5 to 3.5,
   the amount of the polymer is from 5 to 40% by weight, based on the amount of all components of the formulation,
   the metal ion is at least one selected from the group consisting of $Zn^{2+}$, $Ca^{2+}$, $Mg^{2+}$ and $Al^{3+}$, and
   the amount of metal ions is from 0.01% by weight to 25% by weight, based on the total amount of all polymers X, wherein the passivation is a chromium and fluoride free passivation and there are no ions of nickel, of manganese and of cobalt are used in the process.

2. The process according to claim 1, wherein the formulation furthermore comprises phosphate ions.

3. The process according to claim 1, wherein the formulation furthermore comprises methanesulfonate ions.

4. The process according to claim 1, wherein the water-soluble polymer X is a copolymer X1 which is composed of the following monomeric units-based in each case on the amount of all monomers incorporated as polymerized units in the copolymer:
   (A) from 40 to 90% by weight of (meth)acrylic acid,
   (B) from 10 to 60% by weight of at least one further monoethylenically unsaturated monomer which differs from (A) and has one or more acidic groups, and
   (C) optionally from 0 to 30% by weight of at least one further ethylenically unsaturated monomer differing from (A) and (B).

5. The process according to claim 4, wherein the monomers (B) are monomers
   (B1) monoethylenically unsaturated dicarboxylic acids having 4 to 7 carbon atoms or
   (B2) monoethylenically unsaturated phosphoric and/or phosphonic acids or a mixture of (B1) and (B2).

6. The process according to claim 5, wherein the copolymer comprises at least one monomer (B1) and at least one monomer (B2).

7. The process according to claim 6, wherein the amount of the monomers (A) is from 50 to 90% by weight, the amount of (B1) is from 5 to 45% by weight, the amount of (B2) is from 5 to 45% by weight and the amount of (C) is from 0 to 20% by weight.

8. The process according to claim 6, wherein the amount of the monomers (A) is from 50 to 80% by weight, the amount of (B1) is from 12 to 42% by weight, the amount of (B2) is from 8 to 38% by weight and the amount of (C) is from 0 to 10% by weight.

9. The process according to claim 5, wherein (B1) is maleic acid and (B2) is vinylphosphonic acid.

10. The process according to claim 1, wherein the formulation furthermore comprises from 0.01% to 70% by weight of at least one dispersed wax, based on the polymer X.

11. The process according to claim 1, wherein the metallic surface is one comprising Zn, Mg, Al, Sn, Fe, Ni or alloys thereof.

12. The process according to claim 1, wherein the metal surface is the surface of a strip metal.

13. The process according to claim 12, wherein the strip metal is electrogalvanized or hot-galvanized steel.

14. The process according to claim 1, wherein the treatment is carried out by means of a continuous process.

15. The process according to claim 1, wherein the amount of the polymer to 2 to 35% by weight based on the weight of all components in the formulation.

16. The process according to claim 1, wherein the amount of the polymer to 5 to 25% by weight based on the weight of all components in the formulation.

17. The process according to claim 1, wherein the degree of neutralization of the acid groups in the polymer to not more than 40%.

18. The process according to claim 1, wherein the degree of neutralization of the acid groups in the polymer from 0 to 30 mol %.

19. The process according to claim 1, wherein the degree of neutralization of the acid groups in the polymer from 0 to 20 mol %.

20. The process according to claim 1, wherein the degree of neutralization of the acid groups in the polymer from 2 to 10 mol %.

* * * * *